United States Patent [19]

Matlack

[11] Patent Number: 4,532,313
[45] Date of Patent: Jul. 30, 1985

[54] METHOD FOR PREPARING AN IMPROVED CATALYST SUPPORT, ZIEGLER-NATTA CATALYST UTILIZING SAID SUPPORT AND POLYMERIZATION OF 1-OLEFINS UTILIZING SAID CATALYST

[75] Inventor: Albert S. Matlack, Hockessin, Del.

[73] Assignee: HIMONT Incorporated, Wilmington, Del.

[21] Appl. No.: 642,251

[22] Filed: Aug. 20, 1984

Related U.S. Application Data

[63] Continuation of Ser. No. 606,546, May 3, 1984, abandoned, which is a continuation of Ser. No. 434,099, Oct. 13, 1982, abandoned.

[51] Int. Cl.$^3$ .................. C08F 4/02; C08F 10/00; C08F 4/64; C01F 5/30
[52] U.S. Cl. .................. 526/125; 423/498; 502/103; 502/104; 502/115; 502/134
[58] Field of Search .................. 423/498; 526/125; 502/102, 103, 104, 115, 134

[56] References Cited

U.S. PATENT DOCUMENTS 4,277,372 2/1981 Matlock .................. 502/104

*Primary Examiner*—Earl C. Thomas
*Attorney, Agent, or Firm*—Jeffrey F. Craft

[57] ABSTRACT

Disclosed is a transition metal component of a Ziegler-Natta catalyst which is composed of a titanium halide deposited on an essentially anhydrous magnesium chloride support. An improved support is prepared by contacting a hydrocarbon solution of magnesium alkanoate and a hydrocarbon solution of alkylaluminum dichloride in a liquid hydrocarbon reaction medium containing alkylaluminum dichloride and alkylaluminum alkanoate chloride. After workup and treatment with the titanium halide, the transition metal component is used in the Ziegler-Natta catalysis polymerization of 1-olefins. The resulting polyolefins have a narrow particle size distribution and a high bulk density.

10 Claims, No Drawings

METHOD FOR PREPARING AN IMPROVED CATALYST SUPPORT, ZIEGLER-NATTA CATALYST UTILIZING SAID SUPPORT AND POLYMERIZATION OF 1-OLEFINS UTILIZING SAID CATALYST

This application is a continuation of the co-pending application Ser. No. 606,546, filed May 3, 1984, and now abandoned, which is a continuation of the then co-pending application Ser. No. 434,099, filed Oct. 13, 1982, now abandoned.

BACKGROUND OF THE INVENTION

The invention relates to the preparation of an essentially anhydrous magnesium chloride support for use in the polymerization of 1-olefins. More particularly, it relates to a process for forming magnesium chloride in an improved reaction medium. The magnesium chloride, upon workup and treatment with titanium halide, provides a superior transition metal component for use in the polymerization of 1-olefins.

As is well known in the art, effective catalysts for polymerization of 1-olefins are Ziegler-Natta catalysts obtained by combining transition metal compounds of Groups IVb to VIb of the periodic table with organometallic compounds of Groups I to III of the table. It also is known that these catalysts can be made more effective by depositing the transition metal compound on an inorganic support.

Representative of the inorganic supports shown in the art are magnesium and titanium oxides, aluminum silicate, magnesium carbonate, magnesium chloride, magnesium hydroxide, magnesium alkoxides and complex oxides of magnesium and aluminum. These supports usually require activation either prior to or following deposition of the transition metal compound on the support, activation generally being accomplished by ball milling or by calcination. As a consequence, it has been difficult to control the particle size of the solid support and to obtain sufficient catalytic activity and mileage from the transition metal compound that the catalyst need not be removed from the polyolefin product.

It has been shown in U.S. Pat. No. 4,277,372 that a magnesium chloride support can be advantageously formed by first contacting a hydrocarbon solution of a magnesium alkanoate with a hydrocarbon solution of an alkylaluminum dichloride, then isolating the resulting magnesium chloride particles, subjecting them to several hydrocarbon washes, treating them with an electron donor and again washing them with a hydrocarbon.

Now it has been found that the method disclosed in U.S. Pat. No. 4,277,372 is improved when the hydrocarbon solution of magnesium alkanoate and the hydrocarbon solution of alkylaluminum dichloride are contacted in a liquid hydrocarbon reaction medium containing alkylaluminum dichloride and alkylaluminum alkanoate chloride. The magnesium chloride, thus formed is isolated from the liquid hydrocarbon reaction medium, then worked up and treated with a titanium halide. The resulting transition metal component is used in the Ziegler-Natta catalyzed polymerization of 1-olefins with the effect of forming polyolefins having a narrow particle size distribution and a high bulk density.

SUMMARY OF THE INVENTION

The invention encompasses a method for forming a magnesium halide in an improved reaction medium. The magnesium halide, upon workup and treatment with titanium halide provides an improved transition metal component for use in the catalysis of 1-olefin polymerization. The magnesium halide is prepared by reacting a hydrocarbon solution of magnesium alkanoate with a hydrocarbon solution of an alkylaluminum dichloride. The reaction is carried out in a liquid hydrocarbon reaction medium which contains from about 0.05 to about 0.6, preferably from about 0.15 to about 0.4 moles alkylaluminum dichloride per liter and from about 0.05 to about 0.8, preferably from about 0.15 to about 0.7 moles alkylaluminum alkanoate chloride per liter. The reaction product, a hydrocarbon-insoluble precipitate, is then isolated from the hydrocarbon reaction medium and worked up by washing with a hydrocarbon; contacting with an electron donor; and washing again with a hydrocarbon.

DETAILED DESCRIPTION OF THE INVENTION

The improved method of forming magnesium chloride for use as a solid support in the Ziegler-Natta catalysis of 1-olefin polymerization comprises contacting, in a liquid hydrocarbon reaction medium, two reactants: a hydrocarbon solution of magnesium alkanoate and a hydrocarbon solution of alkylaluminum dichloride. An improved magnesium chloride, one that can be used as the transition metal support in the preparation of products having a narrow particle size distribution and high bulk density is formed when the reaction medium contains alkylaluminum dichloride and alkylaluminum alkanoate chloride. For instance, in the polymerization of polypropylene, use of this improved catalyst system results in the production of a polypropylene having a bulk density of at least 0.46 g/cc and a particle size distribution such that less than about 5% of the polymer particles are retained on a 20 mesh screen, less than about 2% of the polymer particles pass through a 100 mesh screen and about 90% or more of the particles are retained on two adjacent screens when the polypropylene is analyzed using the ASTM D-1921 procedure.

The magnesium alkanoates used as one of the two reactants are those which are appreciably soluble in the hydrocarbon solvents used in the process. Representative of these alkanoates are the magnesium salts of those aliphatic carboxylic acids containing six or more carbon atoms, preferably from six to about eighteen carbon atoms. These acids may be linear or branched-chain acids and, as examples of such acids which provide hydrocarbon-soluble magnesium salts, mention may be made of 2-methyl-, 3-methyl-, 2,2-dimethyl- and 2,2,4,4-tetramethyl-pentanoic acids, 2-ethyl-, 2-methyl- and 3,5,5-trimethyl-hexanoic acids, 2-ethyl-2-methylbutyric acid, 2,3-dimethyl-2-isopropylbutyric acid, 2,2-dimethylheptanoic acid, 2,2-dimethyloctanoic acid, 2,2-dimethylnonanoic acid, decanoic acid, 2,2-dimethyl decanoic acid, undecanoic acid, 2,2-dimethylundecanoic acid, dodecanoic acid, 2,2-dimethyldodecanoic acid, tridecanoic acid, 2,2-dimethyltridecanoic acid, 2,2-dimethylpentadecanoic acid, oleic acid, phenylacetic acid, 4-cyclohexylphenylacetic acid, alpha-cyclopentylphenylacetic acid, 3-cyclohexyl-, 3-cyclopentyl- and 3-phenylpropionic acids, 2-, 3- and 4-cyclohexyl- and phenylbutyric acids and 5-cyclohexyl- and phenylpentanoic acids. Mixtures of these acids can be used in the formation of the hydrocarbon-soluble magnesium alkanoates.

The alkylaluminum dichlorides used as the other reactant contain an alkyl group of from about two to about twenty carbon atoms. The alkyl group may, for example, be ethyl, n-propyl, isopropyl, n-butyl, isobutyl, sec-butyl, tert-butyl, n-amyl, isoamyl, n-hexyl, n-heptyl, n-octyl, n-decyl or n-dodecyl. Specific compounds corresponding to the preceding description are ethylaluminum dichloride, butylaluminum dichloride and hexylaluminum dichloride. The corresponding dialkylaluminum chlorides are not nearly as effective as the alkylaluminum dichlorides in the process of this invention.

The hydrocarbon used as solvent for the reactants and the reaction medium may be any liquid hydrocarbon or mixture thereof. Representative hydrocarbons are the $C_5$-$C_{12}$ aliphatic hydrocarbons, the $C_5$-$C_{12}$ cycloaliphatic hydrocarbons, the $C_6$-$C_{12}$ monocyclic aromatic hydrocarbons or mixtures of any of these hydrocarbons. The preferred hydrocarbons are the $C_5$-$C_{12}$ aliphatic hydrocarbons and the $C_6$-$C_{12}$ monocyclic aromatic hydrocarbons. These same hydrocarbons also are used as the diluents in washing the isolated magnesium chloride particles and in the suspensions of said particles used in the preparation of the supported titanium halide catalyst component. Selection of the particular hydrocarbon to use depends primarily upon its performance in any given step in the process. Representative of the aliphatic hydrocarbon solvents are pentane, hexane, heptane, octane and dodecane. Representative of the cycloaliphatic hydrocarbons are cyclopentane, cyclohexane and decahydronaphthalene, and exemplary of the aromatic hydrocarbons are benzene, toluene and xylene.

The alkylaluminum dichlorides contained in the liquid hydrocarbon reaction medium are chosen from the same type of alkylaluminum dichlorides as are used as reactants. As a practical matter, the same alkylaluminum dichloride should be chosen for the reaction medium and the reactant. The molarity of the alkylaluminum dichloride in the reaction medium, prior to the addition of the magnesium alkanoate reactant, should be from about 0.05 to about 0.6 molar, preferably from about 0.15 to about 0.4 molar.

The alkylaluminum alkanoate chlorides contained in the liquid hydrocarbon medium are those wherein the alkyl group is a $C_2$-$C_{20}$ alkyl group chosen from the same type of alkyl groups as are used in the alkylaluminum chloride. As a practical matter the alkyl group to be incorporated in the alkylaluminum alkanoate chloride is the same alkyl group as is used in the alkylaluminum dichloride.

The alkanoate groups which are part of the alkylaluminum alkanoate chloride are chosen from the same type of alkanoate groups as are used in the magnesium alkanoate. Again, for practical considerations it is preferred that the same alkanoate be incorporated in the alkylaluminum alkanoate chloride as is employed in the magnesium alkanoate.

The amount of alkylaluminum alkanoate chloride added to the reaction medium is an amount sufficient to provide a concentration of about 0.05 moles per liter to 0.8 moles per liter preferably from about 0.15 moles per liter to 0.7 moles per liter.

In practicing the method it is not required that either the alkylaluminum dichloride or the alkylaluminum alkanoate chloride be absolutely pure. For instance, it is almost always the case that where there is alkylaluminum alkanoate chloride there will also be a certain amount of the corresponding free acid and aluminum alkanoate dichloride. Of course, it will be clear to one skilled in the art, that the reaction medium may not contain any impurities which would inactivate the catalyst.

It has been found that the reaction medium is preferentially formed simply by employing the mother liquor resulting from an earlier reaction, where the conditions of the earlier reaction are chosen so that an excess of both the alkylaluminum dichloride ($RAlCl_2$) and the alkylaluminum alkanoate chloride ($RAl(OOCR')CL$), in ranges set forth above, remains after the reaction is complete. The alkylaluminum dichloride present in the mother liquor is simply unreacted reactant. The alkylaluminum alkonoate chloride present in the mother liquor is formed as a byproduct of the reaction. The situation is illustrated by the following equation:

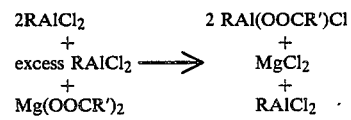

The reaction between the magnesium alkanoate and the alkylaluminum dichloride should be carried out under an atmosphere of an inert gas such as nitrogen or argon and is best carried out by simultaneously adding the hydrocarbon solution of the alkylaluminum dichloride and the hydrocarbon solution of the magnesium alkanoate to a hydrocarbon reaction medium. Better control of the reaction is obtained than when either of the reactants is added to the other. Regardless of the mode of addition of the reactants, the aluminum to magnesium mole ratio should be at least 2:1, preferably from 2:1 to about 10:1, and more preferably from about 2.5:1 to about 4:1. The ratio of Al:Mg is critical in that, if the ratio is appreciably less than 2:1, for example, is from 1:1 to 1.8:1, the resulting catalyst is unsatisfactory in that it has insufficient activity in the polymerization of 1-olefins. The reaction of the alkanoate and the dichloride ordinarily is effected at a temperature in the range of from about 10° C. to about 100° C., preferably from about 20° C. to about 50° C. The reaction time may be widely varied, for example, from about 0.5 to about 5 hours, but usually is from about two to about three hours.

The precipitated magnesium chloride particles may be separated from the reaction mixture by filtration or by centrifuging the reaction mixture and decanting the supernatant liquid. In some cases, the particles will readily settle from the reaction mixture and only decantation of the supernatant liquid is required to effect separation of the particles. The isolated particles are then washed a sufficient number of times with fresh hydrocarbon to remove substantially all chloride ion and unadsorbed aluminum compounds. However, the washed particles may contain small residual amounts of hydroxyl and carboxyl functionalities, which are believed to assist in retaining the titanium halide when it is deposited on the support particles. For example, analysis of a typical magnesium chloride support made in accordance with the process of this invention showed the presence of 2.3 mole percent of 2-ethyl-hexanoic acid based on the magnesium chloride.

An important step in the process of this invention, resulting in higher rates and mileages and in greater stereospecificity of the polypropylene, is that in which the magnesium chloride particles are treated with an electron donor subsequent to their precipitation and the hydrocarbon washing of the precipitated particles. The amount of electron donor used should be from about 1:10 to about 5:1, preferably from about 1:5 to about 1:1, on a molar basis relative to the amount of magnesium present, and the donor treatment ordinarily is for a period of from about 0.25 hour to about one hour at a temperature in the range of from about 20° to about 50° C.

The electron donors used in the process of this invention are ethers, esters, amines, alcohols, phenols, phosphines and sulfides. The ethers include aliphatic ethers containing four to 24 carbon atoms, such as diethyl ether, diisopropyl ether, dibutyl ether, diamyl ether, dihexyl ether and dioctyl ether, with dibutyl ether and diisoamyl ether being particularly preferred; cyclic ethers containing three or four carbon atoms such as dioxane, tetrahydrofuran and 1,3-propylene oxide; and aromatic or alkyl aromatic ethers containing seven to 15 carbon atoms such as diphenyl ether and anisole. The esters include those alkyl esters of fatty acids wherein the esters contain a total of four to 24 carbon atoms, such as ethyl acetate, propyl acetate, butyl acetate, amyl acetate, methyl butyrate and methyl oleate; and those alkyl esters of aromatic acids wherein the esters contain a total of eight to 24 carbon atoms, such as methyl benzoate, ethyl benzoate, isoamyl benzoate, ethyl anisate, ethyl toluate and dioctyl phthalate.

The amines include aliphatic primary, secondary and tertiary mono- and di-amines containing one to 12 carbon atoms, such as methylamine, diethylamine, tributylamine, methyl ethyl propyl amine, ethylene diamine and tetramethyl ethylene diamine; cyclic amines containing 4 to 6 carbons such as morpholine, pyrrolidine and piperidine; and aromatic amines containing six to 10 carbon atoms, such as aniline, pyridine and quinoline. The alcohols include aliphatic alcohols containing one to 18 carbon atoms, such as methanol, ethanol, propanol, dodecanol and octadecanol; and aromatic alcohols containing 7 to 15 carbon atoms, such as benzyl alcohol and p-methylbenzyl alcohol. The phenols include those with six to 10 carbon atoms, such as phenol, 2,6-dimethyl phenol, p-cresol and beta-naphthol. The phosphines include aliphatic trialkyl and triaromatic phosphines containing 6 to 18 carbon atoms, such as triethyl phosphine, tri-isobutyl phosphine, triphenyl phosphine, and ethyl diphenyl phosphine. The sulfides include the aliphatic sulfides containing 6 to 12 carbon atoms, such as dibutyl sulfide.

Preferred electron donors are the aliphatic ethers. These ethers appear to facilitate removal of residual unadsorbed aluminum compounds from the magnesium chloride particles, thus resulting in increased catalytic activity of the titanium compound. Further improvements provided by the ether treatment appear to be the result of coordination of the ether with the support particles and subsequently serving as an agent for fixing the titanium halide on these particles.

The titanium halides which are deposited on the magnesium chloride supports of this invention are well known, examples thereof being titanium tetrachloride, methoxytitanium trichloride, titanium tetrabromide and titanium tetraiodide. More generally, the titanium halides are characterized by the formula $TiX_n(OR)_{4-n}$, wherein R is a $C_1$-$C_{20}$ alkyl group, X is chlorine, bromine or iodine and n is 1, 2, 3 or 4. Titanium tetrachloride is preferred. Procedures for depositing the titanium halide on a solid support also are known. However, in accordance with this invention, the titanium halide is preferably added to the magnesium chloride support in a controlled, relatively small amount. The amount of titanium retained on the support, based on the magnesium, is generally from about one to about five mole percent. There is very little reduction of the tetravalent titanium to trivalent titanium because of the substantial removal of aluminum compounds from the magnesium chloride support by hydrocarbon washing and subsequent ether treatment of the support particles. Thus, there is little aluminum present to effect reduction of the tetravalent titanium.

The amount of tetravalent titanium halide added to the support in accordance with this invention is such that the amount of titanium does not exceed the amount of magnesium in the support on a molar basis. In actual practice, the magnesium to titanium mole ratio is in the range of from about 200:1 to about 1:1, preferably from about 80:1 to about 5:1. Nevertheless, the comparatively small amount of titanium in the catalyst is so highly active that rates and mileages are improved considerably in comparison to previously known catalysts.

In conjunction with depositing the titanium halide on the magnesium chloride support, it may be desirable to treat the support with an electron donor, more specifically, an alkyl ester of an aromatic acid wherein the ester contains a total of 8 to 24 carbon atoms, such as ethyl benzoate. This particular group of electron donor compounds exhibits the effect of increasing the stereospecificity of the titanium halide in the production of polypropylene. However, excessive amounts of these esters have an adverse effect on the activity of the titanium catalyst, and the amount of the ester must be controlled in order that the titanium to ester mole ratio lies in the range of from about 0.5:1 to about 10:1, preferably from about 2:1 to about 4:1. Both the ester treatment of the support and the deposition of the titanium halide on the support may be carried out at a temperature of from about 10° to about 100° C., preferably from about 15° to about 60° C., for a period of from about 0.25 hour to about two hours. Following deposition of the titanium halide on the support, the support particles are again washed with hydrocarbon.

The support, after treatment with the titanium halide, also may be further treated with an electron donor, preferably an aliphatic ether containing four to 24 carbon atoms. The amount of ether used may be about the same as that used in the ether treatment following precipitation and hydrocarbon washing of the magnesium chloride particles in the support preparation, but may be less or as much as five times greater. The instant ether treatment is carried out at the same range of temperatures and for the same range of times as is used in the ester and titanium halide treatments. Finally, the supported catalyst particles are thoroughly washed with fresh hydrocarbon and resuspended in hydrocarbon for use in the polymerization of 1-olefins.

The organometallic compounds of Groups I to III of the periodic table which serve as activator components in the Ziegler-Natta catalysis of 1-olefins are well known. The organoaluminum compounds are preferred, particularly the trialkyl aluminums such as triethyl aluminum, tri-n-propyl aluminum, triisopropyl aluminum, tri-n-butyl aluminum, tri-isobutyl aluminum, tri-n-hexyl aluminum and tri-n-decyl aluminum. These trialkyl aluminums may be used alone or as mixtures and are preferably partially complexed with an electron donor such as an organic acid ester. The preferred esters are the alkyl esters of aromatic acids wherein the esters contain a total of eight to 24 carbon atoms, such as ethyl anisate. Similarly well known are the 1-olefins which may be polymerized using Ziegler-Natta catalysts. Representative of these olefins are ethylene, propylene, 1-butene, 4-methyl-pentene-1 and 1-hexene.

The following examples are included to further illustrate the invention. They are not limitations thereon.

EXAMPLE I

All work was carried out under dry nitrogen. Particle size distribution were determined in accordance with ASTM method D-1921.

Support Preparation

A 500 ml four-necked, round bottomed flask was equipped with a mechanical stirrer, two pressure-equalized dropping funnels with needle value stopcocks of poly(tetrafluoroethylene), a thermometer, a nitrogen inlet, a nitrogen outlet and a bubbler. All components of the apparatus were dried and purged with nitrogen. A nitrogen atmosphere was provided throughout the reaction. One dropping funnel was charged with 39.0 ml of 0.77 M magnesium 2,2-dimethyloctanoate (30 mmoles) in an approximately 85 aliphatic: 15 cycloaliphatic hydrocarbon mixture having a boiling point range of about 175° to 190° C. which was 0.098 M in free 2,2-dimethyloctanoic acid. Two ml of 3.0 M (based on molecular weight or repeating unit) poly(methylhydrogensiloxane) in hexane (6 mmoles, 20 mole % based on Mg) and 5.7 ml of hexane were added to the same dropping funnel. Nitrogen from a long needle was bubbled through the mixture to mix it well. The second dropping funnel was charged with 28.5 ml of 3.16 M ethylaluminum dichloride (90 mmoles) in heptane and 18.2 ml of hexane which were mixed as done in the other dropping funnel. The flask was charged with 17.0 ml (3.3 mmoles of Mg) of an aliquot portion of a previous support preparation, 19.7 ml of dry hexane, and 6.0 ml of the solution of ethylaluminum dichloride from the dropping funnel. The concentration of the ethylaluminum dichloride was 0.34 M and that ethylaluminum 2,2-dimethyloctanoate chloride was 0.16 M. The contents of the two dropping funnels were added at equal rates over a period of one hour forty three minutes, while the mixture was stirred at 260 r.p.m. with a half moon poly(tetrafluorethylene) paddle. Stirring was continued for another 15 minutes. Hexane was added to make a total volume of 170 ml.

The supernatant was decanted from a 50 ml portion of this product. The solid was washed three times with 50 ml portions of hexane, then was resuspended to a total volume of 50 ml. To this slurry (9.7 mmoles Mg) was added 18.0 ml of 0.51 M n-butyl ether (9.2 mmoles) in hexane and the resulting admixture was tumbled end over end for 45 minutes at room temperature. The supernatant was decanted and the resulting solid washed three times with 50 ml portions of hexane.

Catalyst Preparation

After resuspending the ether-treated particles from the above preparation to 50 ml in hexane, a solution of 4.5 ml 0.1 M ethyl benzoate (0.45 mmole) was added. After this mixture was tumbled for 45 minutes at room temperature, a solution of 3.1 ml 0.3 M titanium tetrachloride (9.3 mmoles) was added. After this mixture was tumbled for 45 minutes at room temperature, the supernatant was decanted and the solid washed three times with 50 ml portions of hexane. The slurry was resuspended to 50 ml with hexane.

Polymerization of Polypropylene

A one-gallon stainless steel reactor was flushed with argon and charged with 2.5 l of hexane under argon. The hexane was sparged with argon, then with propylene. Then there was added to the reactor with stirring 2.5 ml 0.38 M triethylaluminum (0.75 mmole) in hexane, 1.7 ml 0.39 M diethylaluminum chloride (0.65 mmole) in hexane and 2.5 ml 0.2 M methyl p-toluate (0.50 mmole) in hexane. Eleven ml of the catalyst slurry from the preceding preparation was added. The mixture was stirred for 15 minutes under 5 p.s.i.g. propylene at room temperature. Then the temperature and propylene pressure were raised rapidly to 70° C. and 120 p.s.i.g., where they were held for 2 hours, after which the addition of propylene was discontinued, the reactor was cooled and vented. The reaction mixture was discharged and filtered while hot.

Analysis showed the presence of 9.2 g of soluble polymer in the filtrate. The insoluble polymer recovered from the filtration amounted to 598.0 g, this representing a 98.5% yield of diluent-insoluble polymer. Recrystallization of a portion of the latter from decahydronaphthalene showed the presence of 4.3% solubles. The diluent-insoluble polymer contained 140 ppm Mg and less than 2 ppm Ti. It had a bulk density of 0.52 g/cc, and the particle size distribution was:

| Mesh Size: | On 20 | 40 | 60 | 80 | 100 | 200 | through 200 |
|---|---|---|---|---|---|---|---|
| Weight % | 1.1 | 82.4 | 14.0 | 1.1 | 0.6 | 0.6 | 0.3 |

The intrinsic viscosity of a 0.1% solution in decahydronaphthalene at 135° C. was 6.62 dl/g.

EXAMPLE II

The support and catalyst preparations of Example I were repeated except that a synthetic mother liquor was used. The flask was charged with a mixture of 2.4 ml 1.5 M ethylaluminum dichloride (3.6 mmoles) in heptane, 2.0 ml 1.47 M diethylaluminum chloride (2.94 mmoles) in heptane, 0.63 ml 2,2-dimethyloctanoic acid (3.29 mmoles) and 28.4 ml of hexane. After the initial addition of 6.0 ml of the solution of ethylaluminum dichloride from the dropping funnel the solution in the flask contained 0.38 M ethylaluminum dichloride and 0.075 M ethylaluminum chlorodi-2,2-dimethyloctanoate.

Polymerization of Propylene

An 800 ml glass polymerization vessel was charged with 400 ml of hexane and after sparging the vessel with argon, the hexane was sparged with propylene at room temperature and atmospheric pressure. The total pressure was then adjusted to 5 p.s.i.g. with propylene while 0.32 mmole of triethylaluminum and 0.10 mmole of methyl p-toluate were added to the polymerization vessel, followed ten minutes later by 2.0 ml of the catalyst (0.009 mmole of titanium) prepared as above. After prepolymerization period of 15 minutes, the temperature was raised to 65° C. and the total pressure was adjusted to 37 p.s.i.g. with propylene. Propylene was added continuously to the reaction mixture for three hours to maintain the pressure at 37 p.s.i.g. (2.63 atmospheres partial pressure of propylene), after which the addition of propylene was discontinued and the system was reacted down for 15 minutes.

The white polypropylene product was filtered while hot, washed once with 150 ml of fresh hexane which was at room temperature, and dried. The insoluble polymer product (65.2 g) was 98.1% of the total. It was found to contain 112 ppm Mg. It had a bulk density of 0.47 g/cc. The particle size distribution of the product was:

| Mesh Size: | on 20 | 40 | 60 | 80 | 100 | 200 | through 200 |
|---|---|---|---|---|---|---|---|
| Weight % | 0 | 17.1 | 75.2 | 6.6 | 0 | 0.9 | 0 |

EXAMPLE III

The support preparation of Example I was repeated except that no poly(methylhydrogensiloxane) was present in the run or in the recycled mother liquor and no solid was present in the recycled mother liquor.

Catalyst Preparation

The supernatant was decanted from ether-treated particles from 10 ml of the above preparation. The solid was washed three times with 10 ml portions of hexane. After the final wash, the solid particles were resuspended in hexane to provide a slurry having a total volume of 10 ml. To this was added 1.8 ml of 0.1 M methyl p-toluate in hexane and the resulting admixture was tumbled for 45 minutes at room temperature. The supernatant was decanted. After adding 3.0 ml of neat titanium tetrachloride, the mixture was heated at 140° C. for 30 minutes with occasional shaking. After cooling the tube, the supernatant was decanted and the solid washed five times with 10 ml portions of hexane. The solid was resuspended in hexane to a total volume of 10 ml.

Polymerization of Propylene

The polymerization was carried out as in Example II. The product polymer was 95.4% insoluble in the diluent contained 225 ppm MG and had a bulk density of 0.49 g/cc. The particle size distribution was determined by a sieve analysis.

| Mesh Size: | On 20 | 40 | 60 | 80 | 100 | 200 | Through 200 |
|---|---|---|---|---|---|---|---|
| Weight % | 0.1 | 80.4 | 15.5 | 2.4 | 0.8 | 0.5 | 0.1 |

COMPARATIVE EXAMPLE I

The procedures for the support and catalyst preparation of Example I were followed, except that the flask was charged with 36.7 ml of hexane and 6.0 ml of the ethylaluminum dichloride solution from the dropping funnel. No mother liquor from a previous support preparation was used.

The polymerization was carried out as in Example II. The product polymer was 93.4% insoluble in the diluent, contained 185 ppm Mg and had a bulk density of 0.33 g/cc. The particle size distribution of the product was:

| Mesh Size: | On 20 | 40 | 60 | 80 | 100 | 200 | Through 200 |
|---|---|---|---|---|---|---|---|
| Weight % | 1.0 | 4.0 | 24.5 | 30.4 | 5.8 | 28.4 | 6.9 |

-continued

%

EXAMPLES IV–XII

Support Preparations

The procedure was that of Example I, scaled up to a 1.5 l jacketed resin kettle with pumps to add the reagents from reservoirs. Undiluted solid-free mother liquor from an earlier run was used. The mother liquor contained 0.3 M ethylaluminum dichloride and ca 0.6–0.7 M ethylaluminum 2,2-dimethyloctanoate chloride. No ethylaluminum dichloride was added before the Mg solution.

After a thorough argon sparge, the resin kettle was charged with 170 ml of supernatant from a previous preparation. Typically 156 ml of 0.78 M magnesium 2,2-dimethyloctanoate (including 1 weight % polymethylhydrogensiloxane) in a 85 aliphatic: 15 cycloaliphatic hydrocarbon mixture having a boiling point range of about 175° to 190° C. and 172 ml of 2.08 M ethylaluminum dichloride in heptanehexane (made by addition of hexane to 3.2 M reagent in heptane) were pumped in. In examples 4 and 5 the rate was doubled after the first 30 minutes. Runs with other concentrations of ethylaluminum dichloride varying from 0.15 M to 0.41, are set forth in Table I.

The supernatant was decanted from 60 ml of the product slurry. The solid was washed once with 60 ml hexane and rediluted to a total of 60 ml. After adding 2.0 ml of isoamyl ether, the slurry was shaken mechanically for 45 minutes at room temperature. The supernatant was decanted and the solid washed with three 60 ml portions of hexane catalyst preparation then made up to 60 ml with hexane. After addition of 2.5 ml of 0.2 M ethyl benzoate, the mixture was shaken mechanically for 45 minutes. After the supernatant was decanted, excess 3 M titanium tetrachloride in hexane (two times the volume of the solid) was added. The mixture was heated overnight at 75°–80° C. After the supernatant was decanted, the solid was washed five times and 60 ml portions of hexane, then rediluted to a total volumne of 60 ml with hexane.

Polymerization of Propylene

The procedure of Example II was used except that the time of polymerization was reduced from three to two hours. The resulting polypropylenes are characterized in Table I.

Comparative Examples II–IV

These were carried out as in Examples IV–XII except that a 85 aliphatic: 15 cycloaliphatic hydrocarbon mixture having a boiling point range of about 175° C. to 190° C. was used in place of hexane. In these examples, 240 ml of 1.56 M ethylaluminum dichloride was used. The 170 ml of synthetic mother liquor was 0.32 M in ethylaluminum dichloride, 0.69 M in ethylaluminum 2,2-dimethyloctanoate chloride. It was made by the general procedure of Example II. The stirrer was a six blade stainless steel turbine, 1.75 inches in diameter, stirrer to tank diameter ratio 0.44. The mixture was stirred at 600 rpm, at 10° C.

In comparative Example III the procedure was repeated except that a 0.3 M solution of ethylaluminum dichloride was used instead of the synthetic mother liquor. Some of the support formed sticky rings on the reactor wall.

In Comparative Example IV the procedure was again repeated except that this time the initial charge to the flask consisted of diluent only. The characterization of the polymers resulting from these three examples is set forth in Table II.

TABLE I

| Example | IV | V | VI | VII | VIII | IX | X | XI | XII |
|---|---|---|---|---|---|---|---|---|---|
| r.p.m. | 600 | 600 | 400 | 600 | 800 | 400 | 600 | 800 | 800 |
| temperature, °C. | 25 | 25 | 10 | 40 | 40 | 25 | 40 | 25 | 25 |
| time of addition, minutes | 136 | 136 | 120 | 120 | 120 | 120 | 120 | 120 | 120 |
| concentration Et Al Cl$_2$ initial[a] | 0.30 M | 0.29 M | 0.28 M | 0.15 M[a] | 0.28 M | 0.15 M[a] | 0.38 M[a] | 0.15 M[a] | 0.41 M[a] |
| % diluent-insoluble polymer | 98.3 | 96.3 | 98.4 | 95.9 | 97.5 | 96.8 | 98.5 | 96.8 | 98.8 |
| ppm Mg | 93 | 130 | 115 | 94 | 123 | 125 | 120 | 100 | 107 |
| bulk density, g/cc | 0.48 | 0.49 | 0.48 | 0.51 | 0.49 | 0.47 | 0.47 | 0.50 | 0.49 |
| particle size distribution | | | | | | | | | |
| On 20 Mesh | 0.6 | 3.2 | 0 | 0.4 | 1.0 | 0.4 | 1.0 | 2.9 | 1.8 |
| 40 | 76.5 | 85.0 | 78.8 | 16.2 | 5.2 | 79.9 | 81.1 | 10.1 | 57.9 |
| 60 | 19.7 | 9.2 | 21.1 | 83.4 | 93.4 | 18.5 | 17.8 | 85.1 | 40.4 |
| 80 | 0.2 | 0.5 | 0 | 0 | 0.1 | 0.2 | 0 | 0.2 | 0 |
| 100 | 2.8 | 2.1 | 0 | 0 | 0.3 | 0.7 | 0 | 1.2 | 0 |
| 200 | 0.2 | 0.1 | 0 | 0 | 0 | 0.3 | 0 | 0.7 | 0 |
| Through 200 | 0 | 0 | 0 | 0 | 0 | 0 | 0 | 0 | 0 |

[a]Extra hexane or ethylaluminum dichloride was added to the usual solid-free mother liquor of a standard run as needed to give 170 ml of the concentration shown for the initial charge in the flask. Corresponding adjustments were made in the concentration of the ethylaluminum dichloride to be pumped in. In examples 7, 9 and 11; 210 ml of 1.5 M solution was used; in examples 10 and 12; 290 ml of 1.5 M solution was used.

TABLE II

| Comparative Example | II | III | IV |
|---|---|---|---|
| r.p.m. | 600 | 700 | 700 |
| temperature °C. | 10 | 25 | 25 |
| time of addition, minutes | 180 | 240 | 240 |
| % diluent-insoluble polymer | 98.9 | 98.9 | 99.0 |
| ppm Mg | 96 | 150 | 145 |
| bulk density, g/cc | 0.50 | 0.49 | 0.49 |
| particle size distribution | | | |
| On 20 Mesh | 0 | 8.2 | 0.5 |
| 40 | 0.3 | 20.2 | 0.4 |
| 60 | 51.3 | 23.3 | 2.3 |
| 80 | 45.8 | 34.0 | 48.4 |
| 100 | 2.5 | 10.3 | 31.6 |
| 200 | 0.2 | 3.9 | 16.7 |
| through 200 | 0 | 0.1 | 0.1 |

I claim and desire to protect by Letters Patent:

1. In a process for the preparation of an essentially anhydrous magnesium chloride support for use in the polymerization of 1-olefins, having the steps of (1) precipitating the product formed by contacting a hydrocarbon solution of a magnesium alkanoate with a hydrocarbon solution of an alkylaluminum dichloride, (2) isolating the precipitation product from the hydrocarbon precipitation medium, (3) successively washing the precipitation product with a hydrocarbon solvent, (4) contacting the washed precipitation product with an electron donor, and (5) washing the electron donor-treated precipitation product with a hydrocarbon solvent, the improvement which comprises contacting the hydrocarbon solution of said magnesium alkanoate with the hydrocarbon solution of said alkylaluminum dichloride in a liquid hydrocarbon reaction medium containing from about 0.05 to about 0.6 mole alkylaluminum dichloride per liter and from about 0.05 to about 0.8 mole alkylaluminum alkanoate chloride per liter.

2. The process for the preparation of an essentially anhydrous magnesium chloride support of claim 1, wherein the improvement comprises contacting the hydrocarbon solution of a magnesium salt of an aliphatic carboxylic acid with the hydrocarbon solution of said alkylaluminum dichloride in a liquid hydrocarbon reaction medium containing from about 0.15 to about 0.4 mole alkylaluminum dichloride per liter and from about 0.15 to about 0.7 mole alkylaluminum alkanoate chloride per liter.

3. An essentially anhydrous magnesium chloride support composition for use in the polymerization of 1-olefins, obtained by the process comprising (1) precipitating the product formed by contacting a hydrocarbon solution of a magnesium alkanoate with a hydrocarbon solution of an alkylaluminum dichloride, (2) isolating the precipitation product from the hydrocarbon precipitation medium, (3) successively washing the precipitation product with a hydrocarbon solvent, (4) contacting the washed precipitation product with an electron donor, (5) washing the donor-treated precipitation product with a hydrocarbon solvent, and (6) contacting the hydrocarbon solution of said magnesium alkanoate with the hydrocarbon solution of said alkylaluminum dichloride in a liquid hydrocarbon reaction medium containing from about 0.05 to about 0.6 mole alkylaluminum dichloride per liter and from about 0.05 to about 0.8 mole alkylaluminum alkanoate chloride per liter.

4. The essentially anhydrous magnesium chloride support of claim 3, wherein the liquid hydrocarbon reaction medium contains from about 0.15 to about 0.4 mole alkylaluminum dichloride per liter and from about 0.15 to about 0.7 mole alkylaluminum alkanoate chloride per liter.

5. In a process for the polymerization of a 1-olefin by Ziegler-Natta catalysis, the improvement wherein the transition metal component comprises a titanium halide deposited on an essentially anhydrous magnesium chloride support prepared by precipitating the product formed by contacting in a liquid hydrocarbon reaction medium containing alkylaluminum dichloride at about 0.05-0.6 mole per liter and alkylaluminum alkanoate chloride at about 0.05-0.8 mole per liter a hydrocarbon solution of a magnesium alkanoate with a hydrocarbon solution of an alkylaluminum dichloride, isolating the precipitation product from the precipitation medium, successively washing the precipitation product with a hydrocarbon solvent, contacting the wash precipitation product with an electron donor, and washing the electron donor-tested precipitation product with a hydrocarbon solvent.

6. The process according to claim 5 wherein said 1-olefin is propylene.

7. An improved transition metal component for use in the Ziegler-Natta catalysis of 1-olefin polymerization, which comprises a titanium halide deposited on an essentially anhydrous magnesium chloride support prepared by precipitating the product formed by contacting in a liquid hydrocarbon reaction medium containing alkylaluminum dichloride at about 0.05–0.6 mole per liter and alkylaluminum alkanoate chloride at about 0.05–0.8 mole per liter a hydrocarbon solution of a magnesium alkanoate with a hydrocarbon solution of an alkylaluminum dichloride, isolating the precipitation product from the precipitation medium, successively washing the precipitation product with a hydrocarbon solvent, contacting the wash precipitation product with an electron donor, and washing the electron donor-treated precipitation product with a hydrocarbon solvent.

8. A transition metal component according to claim 7 in which said titanium halide is titanium tetrachloride.

9. A transition metal component according to claim 8 in which the magnesium to titanium mole ratio is in the range from about 200:1 to about 1:1.

10. A transition metal component according to claim 9 in which said mole ratio is in the range from about 80:1 to about 5:1.

* * * * *